United States Patent [19]

Richards

[11] Patent Number: 4,547,803
[45] Date of Patent: Oct. 15, 1985

[54] PPI TO RASTER DISPLAY SCAN CONVERTER

[75] Inventor: Gerald P. Richards, Framingham, Mass.

[73] Assignee: Raytheon Company, Lexington, Mass.

[21] Appl. No.: 325,448

[22] Filed: Nov. 27, 1981

[51] Int. Cl.$^4$ ............................................. H04N 5/02
[52] U.S. Cl. .................................. 358/140; 343/5 SC
[58] Field of Search ..................... 358/140; 343/5 SC; 364/731, 815

[56] References Cited

U.S. PATENT DOCUMENTS

| | | | |
|---|---|---|---|
| 3,147,474 | 9/1964 | Kliman | 340/347 |
| 3,218,637 | 11/1965 | Balding | 343/5 |
| 3,569,616 | 3/1971 | Baker | 178/6.8 |
| 3,765,018 | 10/1973 | Heard et al. | 358/140 |
| 3,810,174 | 5/1974 | Heard et al. | 343/5 |
| 3,827,027 | 7/1974 | Towson et al. | 340/172.5 |
| 3,904,817 | 9/1975 | Hoffman et al. | 178/6.8 |
| 4,002,827 | 1/1977 | Nevin et al. | 343/5 |
| 4,065,770 | 12/1977 | Berry | 343/5 |
| 4,106,021 | 8/1978 | Katagi | 343/5 |
| 4,149,252 | 4/1979 | Miller, Jr. | 364/731 |
| 4,220,969 | 9/1980 | Nitadori | 358/140 |
| 4,232,376 | 11/1980 | Dion et al. | 365/222 |
| 4,241,412 | 12/1980 | Swain | 364/731 |
| 4,250,559 | 2/1981 | Blaschke | 364/815 |
| 4,275,415 | 6/1981 | Engle | 358/140 |
| 4,348,693 | 9/1982 | Cauldwell | 358/140 |
| 4,471,449 | 9/1984 | Leavitt et al. | 358/140 |

*Primary Examiner*—Joseph A. Orsino, Jr.
*Attorney, Agent, or Firm*—Walter F. Dawson; Joseph D. Pannone

[57] ABSTRACT

A raster display apparatus for converting radar input data which is formatted to produce a Plan Position Indicator (PPI) presentation on a cursive display to a format which achieves a PPI type image on a raster display. The apparatus generates radar images on a raster display screen which appear as targets having continuous arcs of the proper length around the placement position of a radar. Average video levels within successive discrete fixed azimuthal standard angle increments are stored in a radial buffer memory for various increments of range. These video levels are used for all points within the presently active standard angular increment. Radial distance of a given image is computed for changes in orthogonal components such as X or Y using simple prestored sine and cosine functions. Conversion calculations comprise primarily additions using adders. The video amplitude of the image displayed is equal in amplitude to the video level of the input data stored in the radial video buffer memory for the standard angle being processed. Processing of successive standard angle increments proceeds in approximate synchronism with the input data being provided in a cursive display format.

54 Claims, 6 Drawing Figures

PPI TO RASTER DISPLAY SCAN CONVERTER

BACKGROUND OF THE INVENTION

This invention relates to apparatus for the conversion of video information from a radar receiver for display on a cathode ray tube (CRT). More particularly, the radar data is received in a polar coordinate format (R,θ) and converted to a cartesian coordinate format (X,Y) for display on a raster type display device.

The presentation of radially formatted Plan Position Indicator (PPI) type radar data at high resolution has been virtually the exclusive domain of cursive displays. Presentation of such radially formatted data on raster type displays requires a conversion of the scanning direction from radial or polar coordinates to X,Y coordinates; unfortunately, such a conversion cannot be conducted as a one-to-one memory cell exchange because a one-to-one correspondence between R,θ radial cells and X,Y raster cells does not exist.

The prior art attempts to perform the needed conversion from a polar to a cartesian coordinate format by the use of a "closest proximity" re-mapping scan converter approach. With this technique, sample cells of incoming radial data are mapped into the nearest corresponding X,Y addresses. However, the resultant scan converted image is at best marginal and the following deficiencies become evident: the detailed shape of video information is seriously deformed with a resultant loss of net resolution; all X,Y cells do not necessarily contain converted data, that is, black holes can occur within "target" boundaries; the radial intervals between active radials tend to form Moire patterns with the raster X,Y address which are very distracting to an operator; and the storage of converted data in final refresh memory format is complicated by the fact that it is not produced in normal X,Y scanning order. The present invention eliminates all of these deficiencies.

Another approach in the prior art performs a coordinate conversion on radar video input data corresponding to each azimuth angle of a transmitted radar beam. However, time consuming calculations comprising determining trigonometric functions and multiplications have to be performed requiring high speed arithmetic hardware instead of primarily using simple adders.

Other approaches in the prior art of scan converters have involved "horizontal smearing" or "tangential smearing" techniques for filling data gaps between radial lines and/or between regions on each radial. To avoid said gaps, the data for each particular region is used from surrounding regions to fill in the gaps. However, these approaches although probably sufficient for some low density and low resolution applications are not as precise and lack the conversion speed generally required for radar applications where each radial is converted when its data is available rather than waiting for all radial lines to be stored and then initiating a conversion process.

SUMMARY OF THE INVENTION

This invention discloses an apparatus and method for converting data such as radar data defined by an R,θ polar coordinate format to an X,Y cartesian coordinate format for display on a raster display primarily utilizing addition calculations. X addresses and Y addresses are generated for specifying picture elements on a raster display. A radial address is also generated in polar coordinates for each picture element within a standard angle increment on a raster display and this radial address specifies the location of the stored input data that is to be transferred to a mass memory location specified by an X address and a Y address. The radial address represents the range of a picture element from an origin in the X,Y cartesian coordinate system. The X and Y addresses and corresponding radial addresses are generated for all picture elements within a standard angle increment and for all successive standard angle increments which correspond to successive input radial paths comprising digitized data obtained for increments of range along an azimuth angle. The X addresses and the Y addresses for picture elements on a raster display directly correspond to the X addresses and Y addresses of mass memory locations used for the storage of input data prior to transmittal to a raster display. A standard angle increment is the difference between two adjacent standard angles and a quadrant, octant or a full 360° is divided up into a sufficient number of standard angles to enable the required coordinate conversion calculations to be accomplished primarily by additions and an occasional multiplication. Predetermined coordinate conversion values for each standard angle are stored in PROMs.

The invention further discloses means for specifying a standard angle for use during a conversion of defining data with polar coordinates to cartesian coordinates with an input signal causing an advance to successive standard angles, first memory means responsive to the standard angle specifying means for storing conversion values for each standard angle providing a change in an X address for each increment of a Y address, first accumulating means responsive to the first memory means for generating X addresses and for determining start and end boundaries of a plurality of X addresses within a standard angle increment which is the difference between two adjacent standard angles, and means for generating a plurality of successive Y addresses within a standard angle increment during the conversion. In addition, second memory means is disclosed responsive to the standard angle specifying means for storing conversion values for each standard angle, said conversion values providing a change in a range radial described by a radial address for each increment of a Y address which extends from an origin to each said X address and Y address location of a corresponding standard angle boundary. Also disclosed are third memory means responsive to the standard angle specifying means for storing conversion values for each standard angle providing a change in the range radial or radial address for each increment of an X address, second accumulating means for summing the output of the second memory means for each increment of the Y address during a standard angle increment conversion, third accumulating means for summing the incremental changes in the radial address resulting from incremental changes in the X address and Y address wherein the radial address specifies the location of stored input data to be transferred to a mass memory location specified by the X address and Y address, multiplier means responsive to the first accumulating means and third memory means for calculating changes of the radial address resulting from a non-integer increment in said X address, and decoder means responsive to the third accumulating means for determining when a maximum radial address or a maximum X address is reached. The standard angle specifying means comprises one or more counters, and quadrant control means increment or decrement the counters.

This invention further discloses the method of converting data defined by R,θ polar coordinate format to X,Y cartesian coordinate format for display on a raster scan display comprising the steps of generating a plurality of X addresses to specify picture elements on said raster display, generating a plurality of Y addresses to specify picture elements on the raster display, generating a radial address in polar coordinates corresponding to a selected picture element within a standard angle increment on a raster display having an X address and a Y address in cartesian coordinate, said radial address specifying the location of stored input data to be transferred to a mass memory location specified by the X address and the Y address, generating successive X,Y addresses and corresponding radial addresses for all picture elements on a raster display within a standard angle increment, said increment being the difference between two successive standard angles, generating successive X,Y addresses and corresponding radial address for successive standard angle increments corresponding to successive input radial paths, and storing coordinate system conversion values for each said standard angle used for the generation of said X addresses, Y addresses and radial addresses. The step of storing conversion values includes values for each standard angle within an octant, a quadrant or full 360 degrees.

BRIEF DESCRIPTION OF THE DRAWINGS

Other and further features and advantages of the invention will become apparent in connection with the accompanying drawings wherein.

DESCRIPTION OF THE PREFERRED EMBODIMENT

Figure 1A:
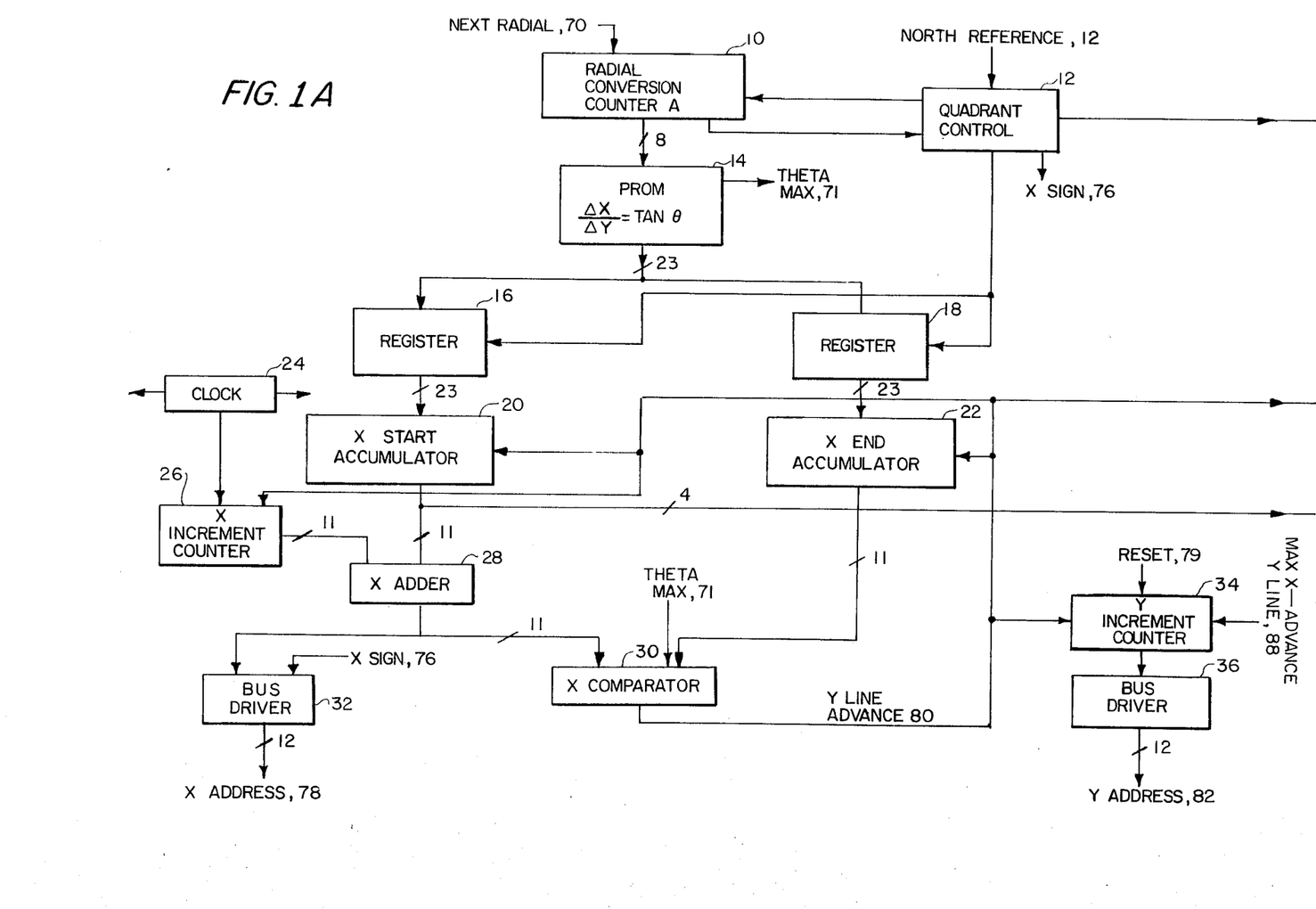
FIGS. 1A and 1B together are a block diagram representation of the invention.
Figure 1B:
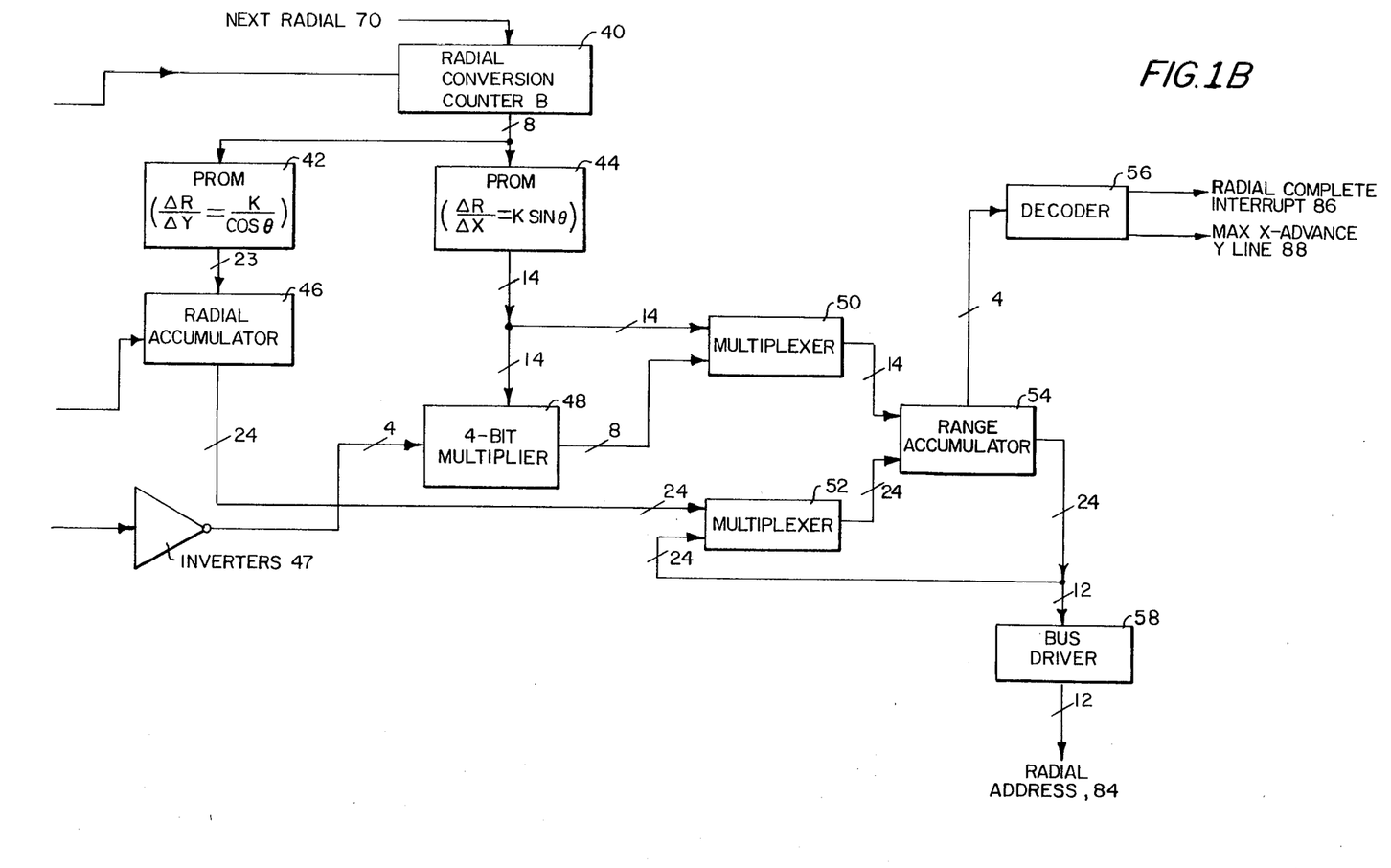
Figure 2:
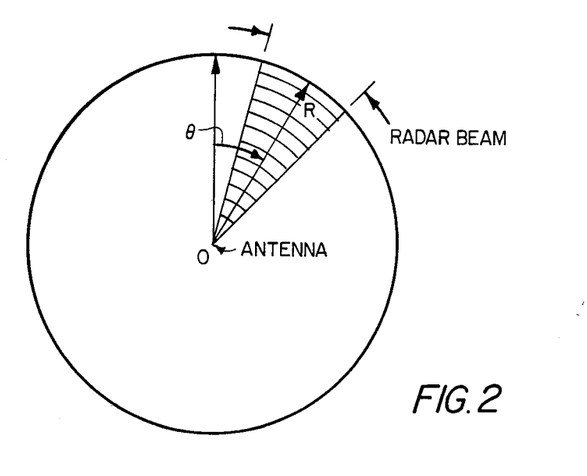
FIG. 2 illustrates a PPI display in R,θ format.

Referring now to FIGS. 1A and 1B, there is shown a block diagram of a digital scan converter according to the present invention for converting radar data in polar coordinates to a cartesian coordinate format for display on a raster type display. Radar beams are transmitted as a series of pulses and the radar returns are received in an R,θ format as illustrated in FIG. 2 where θ is the azimuth position of a radar antenna transmitting a beam and R represents the range radial of targets reflecting the radar beams. This data is readily displayed as a PPI representation on a CRT which has an effective circular display coinciding with the actual radar operation. However, the data may also be displayed on a raster type display, one quadrant of which is partially illustrated in FIG. 3. Each picture element (pixel) along the horizontal scan lines such as A or B is represented by an X,Y address where the X address is the horizontal distance from any chosen vertical reference line on the CRT and the Y address is the vertical distance from any chosen horizontal (reference) line. The hardware of FIGS. 1A and 1B assume an X,Y reference corresponding to the radar center as mapped onto the raster display. The scan converter sequentially fills mass memory locations, corresponding to X,Y positions within each predefined standard angle increment (Δθ) as shown in FIG. 4, with radar data from sample positions along the stored radar data radial applicable to the standard angle increment (Δθ). There typically are 200 to 250 standard radials per quadrant in order to keep the Δθ angle increments less than 0.5° to facilitate the conversion approximation calculations.

The scan converter for performing a coordinate conversion is shown in FIGS. 1A and 1B and comprises Radial Conversion Counter A 10 and Radial Conversion Counter B 40 which generate the addresses for the programmable read-only memories (PROM) that contain the constants applicable to each standard angle. Because standard angles are produced sequentially, sequential counts of the conversion counters define successive regions for conversion. Each counter is incremented by a Next Radial 70 signal. The Radial Conversion Counter A 10, an 8-bit counter, provides an address to PROM 14 and Radial Conversion Counter B 40, also an 8-bit counter, provides an address for PROMs 42 and 44. They are reset to zero via the Quadrant Control 12 logic by the North Reference 72 signal. If N is the number of radials per quadrant, the Radial Conversion Counter A increments from 1 to N in the first quadrant, decrements from N to 0 in the second quadrant, increments from 1 to N in the third, and decrements from N to 0 in the fourth quarter. Radial Conversion Counter B 40 functions similarly except it counts up from 0 to N-1 in the first quadrant, starts at N-1 in second quadrant and counts down to 0, starts at 0 in the third quadrant and counts up to N-1, and starts at N-1 in the fourth quadrant and counts down to 0.

Still referring to FIGS. 1A and 1B, PROM 14 provides a 23 bit (9 integer, 14 fractional) conversion factor for the change in the X address of intersection of the applicable standard radial for each increment of Y address. This factor represents ΔX/ΔY which equals tan θ. Since the processing of successive X,Y points within the present standard angle increment proceeds across all applicable X points for a given Y line, the value defined by PROM 14 must be added (together with the value corresponding to the previous standard angle) to accumulators through registers to define the X boundaries of the next Y line to be processed. An additional bit from PROM 14 indicates Theta Max 71 which inhibits X Comparator 30 and causes an increment in Y only when the MAX-X Advance Y Line 88 signal occurs, since at 90° and 270° the Tan θ is infinite and cannot be added to an accumulator. θ is defined as the upper standard angle in the first quadrant. When there are 200 standard angles or radials per quadrant, θ steps from 0.45° to 90.00°.

The radial range of the starting point of intersection of the applicable standard angle increment (one extreme) with successive Y lines must be defined so that the total radial range of each X,Y point can be computed. PROM 42 provides a 23-bit (10 integer, 13 fractional) conversion factor which represents the increment in radial range for each increment in the Y direction along one boundary of the standard angle or ΔR/ΔY=K/cos θ. The K term within this expression allows for the accommodation of scale (sampling density) differences between mass memory (used for display refresh) storage cell equivalent size and the separation between successive stored radar return samples. PROM 44 provides the change in radial range which results from each increment in the X direction or $\Delta R/\Delta X = K \sin \theta$ for each standard radial. This 14-bit value (2 integer, 12 fractional) is added to the Range Accumulator 54 each time the X address (for a given Y address) is incremented. Both PROM 42 and PROM 44 are addressed by the 8-bit output of Radial Conversion Counter B 40.

Register 16 and Register 18 each provide temporary storage for the previous $\Delta X/\Delta Y$ value produced by PROM 14. The particular register being used during a standard angle conversion is dependent upon the Quadrant Control 12 logic. Using these registers, the upper bound X address of the previous standard angle increment becomes the lower bound X address of the present standard angle increment, thereby assuring the absence of mathematical round-off error at standard angle boundaries. Register 16 connects to the X Start Accumulator 20 which is comprised of a 25-bit, (11 integer, 14 fractional) adder-register combination. It repeatedly (for each increment in Y) adds the value of $\Delta X/\Delta Y$ corresponding to the present standard angle start boundary to produce a definition of the starting X address of X line segments to be processed on each successive Y line of the current standard angle. Register 18 connects to the X End Accumulator 22 which comprises a 25-bit (11 integer, 14 fractional) adder-register combination. It repeatedly (for each increment in Y) adds the value of $\Delta X/\Delta Y$ corresponding to the present standard angle stop boundary to produce a definition of the ending X address of the X line segments to be processed on each successive Y line of the current standard angle.

The X Start Accumulator 20 connects to the X Adder 28 which combines the integer portion of the X address of the standard angle start for the current Y line with the X Increment Counter 26 integer output thereby providing a definition of the current X address being processed. The X Increment Counter 26 comprising 11 bits or stages defines the total number of X addresses which have been processed (plus the present X address being processed) since the start of the current Y line processing. This counter is effectively reset to 1 at the start of each Y line processing within a standard angle except for standard angles starting at 0° and 180° at which point it is preset to 0. A Clock 24 connects to the X Increment Counter 26 as well as controlling all other pixel synchronous operations. The output of the X Adder 28 connects to a Bus Driver 32 which also receives an X Sign 76 Signal from the Quadrant Control 12. The output of the Bus Driver 32 is an X Address 78 which is one of the three main outputs of the scan converter shown in FIGS. 1A and 1B.

The X Adder 28 output also connects to an X Comparator 30. Another input to the X Comparator 30 is the output of the X End Accumulator 22. This 12-bit comparator continuously compares the present integer X address with the maximum integer X address for the current Y line. Detection of an equals condition causes completion of that current point conversion and an advance to the next Y line. Detection of a present X greater than maximum causes the aborting of the present point conversion and an advance to the next Y line. The Y line is also advanced when the maximum range for a selected radar field is reached as determined by Decoder 56 which generates a Radial Complete Interrupt 86 signal effectively causing the reset of the Y Increment Counter by Reset 79 signal. The output of the X Comparator 30 is a Y Line Advance 80 Signal which connects to the Y Increment Counter 34, the X Start Accumulator 20, the X End Accumulator 22, the X Increment Counter 26 and the Radial Accumulator 46. The Y Increment Counter 34 provides a definition of the current Y line. The output connects to Bus Driver 36 which provides a Y Address 82 which is the second main output of the scan converter.

The output word from PROM 42 connects to a 25-bit (12 integer, 13 fractional) Radial Accumulator 46 comprising an adder-register combination. It repeatedly adds (for each increment in Y) the value of $\Delta R/\Delta Y$ to produce a radial sample address applicable to the intersection of the starting standard angle boundary with the current Y line. A 24-bit output from Radial Accumulator 46 connects to one side of Multiplexer 52. A 14-bit output word from PROM 44 connects to Multiplexer 50. Four bits of the output word from PROM 44 connect to a 4-bit Multiplier 48. Because the X address corresponding to the beginning of a standard angle increment (for each Y line) is not in general an integer, the Range Accumulator 54 must be increased in proportion to the fraction remaining to the next integer X address such as $\Delta X_b$ in FIG. 5. The 4-bit Multiplier 48 approximates this correction by weighting the $\Delta R/\Delta X$ magnitude with the ones complement of the fractional portion of the start point address. An 8-bit output from the 4-bit Multiplier 48 connects to the other side of Multiplexer 50. Multiplexers 50 and 52 select the appropriate components for addition to the Range Accumulator 54. At the beginning of each new Y line of a standard angle, the multiplexers provide the output of the Radial Accumulator 46 and the output of the 4-bit Multiplier 48 for summation into the Range Accumulator 54. For each subsequent X increment for the current Y scan line, the multiplexers permit the summation of the Range Accumulator 54 with the value of $\Delta R/\Delta X$ provided by PROM 44. The Range Accumulator 54 is a 24-bit (12 integer, 12 fractional) adder-register combination which defines the stored radar radial video memory address that corresponds to the current X,Y point being processed. At the beginning of each new Y line within a standard angle, this register is caused to assume the range address corresponding to the next integer X address after the X address corresponding to the beginning boundary of the current standard angle at that Y line. For each additional X increment on that Y line, the register is incremented by the value of $\Delta R/\Delta X$ from PROM 44 for that standard angle. The output of Range Accumulator 54 connects to Bus Driver 58 which provides a 12-bit Radial Address 84 which is a third main output of the scan converter. Decoder 56 receives four MSB signals from Range Accumulator 54 and generates the Radial Complete Interrupt 86 which indicates an advance to the next input radial for processing and the Max X-Advance Y Line 88 signals.

Figure 3:
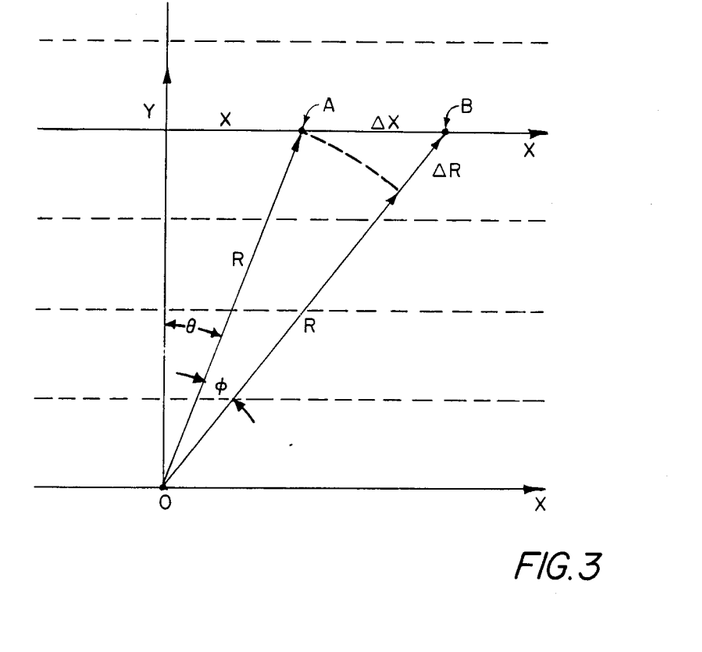
FIG. 3 illustrates a portion of a rectangular X,Y raster display showing a ΔR increment per ΔX increment for two adjacent pixels A and B on a Y line.
Figure 4:
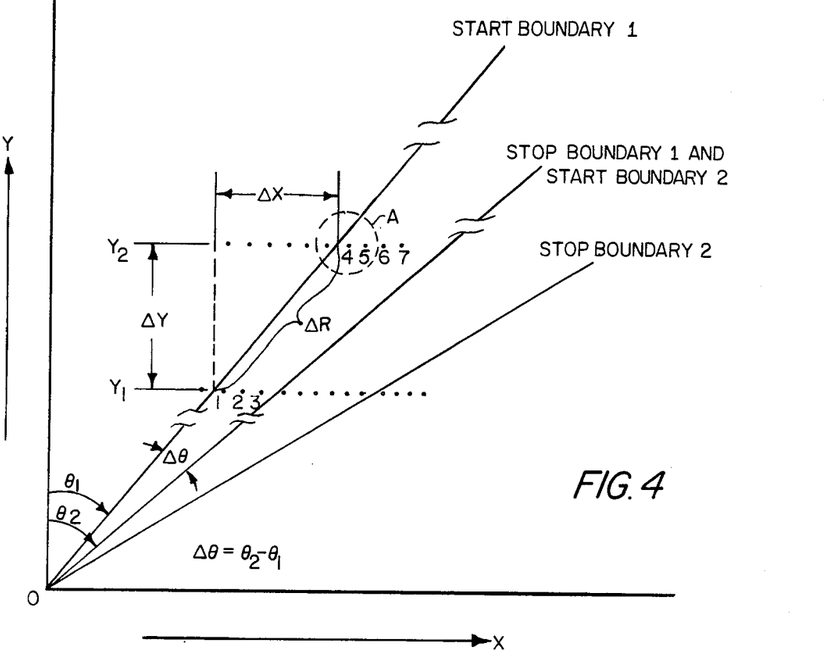
FIG. 4 illustrates a standard angle increment Δθ during a scan conversion with a start boundary 1 defined by $\theta_1$ and a stop boundary 1 defined by $\theta_2$, and showing pixels on two adjacent raster lines $Y_1$ and $Y_2$.

Referring now to FIG. 3, the geometric relationships are shown for a change in radial R ($\Delta R$) per change in X ($\Delta X$). The parameters are defined as follows:

R = Known range to a specific point A on an X line (e.g. the intersection of an X start boundary with current X line).

ΔX = Displacement along X line from known intersection point A (e.g. one integer increment in X address).

R+Δ = Range of point B on X line at end of ΔX displacement.

ΔR = Extension of range resulting from ΔX displacement.

φ = Azimuthal angle subtended by ΔX.

θ = Standard angle.

The determination by the scan converter of the change in radial range which results from each increment in the x direction is based on the approximation $$\Delta R \approx \Delta X \sin \theta$$

which is derived as follows:
From the law of cosines, $$(R + \Delta R)^2 = R^2 + (\Delta X)^2 - 2R(\Delta X) \cos(90° + \theta) \quad (1)$$

$$(R + \Delta R)^2 = R^2 + (\Delta X)^2 + 2R\Delta X \sin \theta \quad (2)$$

Define a variable $$p = R + \Delta X \sin \theta \quad (3)$$

Then, $$p^2 = R^2 + \Delta X^2 \sin^2\theta + 2R(\Delta X) \sin \theta \quad (4)$$

and substituting the identity in equation (2) results in
$$\sin^2\theta + \cos^2\theta = 1 \quad (5)$$

$$(R + \Delta R)^2 = p^2 + (\Delta X)^2 \cos^2\theta \quad (6)$$

From the law of sines, $$\frac{\Delta X}{\sin \phi} = \frac{R + \Delta R}{\sin(90° + \theta)} = \frac{R + \Delta R}{\cos \theta} \quad (7)$$

so, $$\Delta X \cos \theta = (R + \Delta R) \sin \phi \quad (8)$$

and substituting for $(\Delta X)^2 \cos^2\theta$ in equation (6)

$$(R + \Delta R)^2 = p^2 + (R + \Delta R)^2 \sin^2\phi \quad (9)$$

$$(R + \Delta R)^2 (1 - \sin^2\phi) = p^2 \quad (10)$$

or, $$(R + \Delta R)^2 \cos^2\phi = p^2 \quad (11)$$

and, $$R + \Delta R = \frac{p}{\cos\phi} \quad (12)$$

Substituting equation (3) into equation (12)

$$R + \Delta R = \frac{R}{\cos \phi} + \frac{\Delta X}{\cos \phi} \cdot \sin \theta \quad (13)$$

A starting point A along X in FIG. 3 is defined by the angle θ and is analogous to an X start address in the coordinate conversion process. The angle φ depends upon the value of ΔX chosen but cannot be larger than the angular separation between standard angles. For radar systems φmax equal to Δθ is usually 0.5° or smaller but may in some applications be 1.0°. For, $|\phi| < 0.5°$ $$1 \geq \cos \phi \geq 0.99996 \quad (14)$$

and, $$1 \leq \frac{1}{\cos \phi} \leq 1.00004 \quad (15)$$

Substitution of the lower and upper bounds of (15) into equation (13) produces $$\Delta R = \Delta X \sin \theta \text{ (lower bounds)} \quad (16)$$

$$\Delta R = 0.00004R + 1.00004\Delta X \sin \theta \text{ (upper bounds)} \quad (17)$$

Therefore,
$$\Delta X \sin \theta \leq \Delta R \leq 0.00004R + 1.00004\Delta X \sin \theta \quad (18)$$

When $\phi \leq 0.5°$ and for values of R less than 10,000, the approximation $$\Delta R \approx \Delta X \sin \theta \quad (19)$$

provides less than 0.5 error in the R+ΔR length. Few applications require display magnifications or display resolutions which would approach an R of 10,000. Therefore, equation (19) is sufficiently accurate approximation of ΔR. Even when $\phi_{max} = 1.0°$, approximation (19) is sufficiently accurate for R values as large as 2500. The values of ΔR for increments of ΔX are calculated using equation (19) and stored in PROM 44.

PROM 14 supplies the change in the X address (ΔX) of intersection of the applicable standard radial for each increment of Y address as shown in FIG. 4.

$$\frac{\Delta X}{\Delta Y} = \tan \theta \quad (20)$$

PROM 42 supplies the increment in range ΔR for each increment in the Y direction along one boundary of a standard angle, as shown in FIG. 4.

$$\cos \theta = \frac{\Delta Y}{\Delta R} \text{ or } \frac{\Delta R}{\Delta Y} = \frac{1}{\cos \theta}$$

when the Y units are the same as R units; otherwise, there are K units of R for each Y unit and then $$\frac{\Delta R}{\Delta Y} = \frac{K}{\cos \theta} \quad (21)$$

Figure 5:
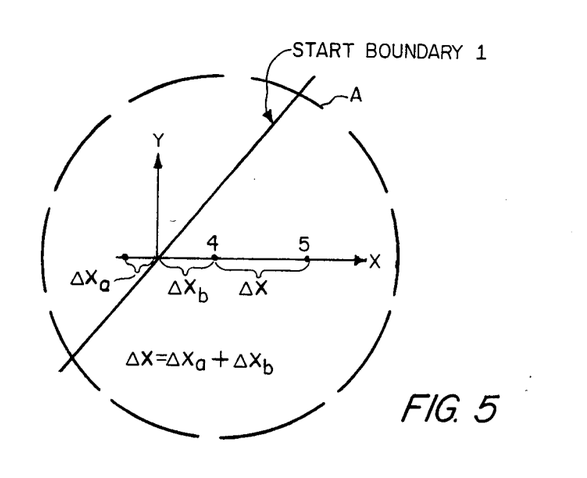
FIG. 5 is an enlargement of the area around pixels 4 and 5 on a raster display near the intersection of the Start Boundary 1 side of a standard angle with a raster line $Y_2$ showing the non-integer or fractional distance $\Delta X_b$ and the integer distance $\Delta X$.

The operation of the scan converter as shown in FIGS. 1A and 1B is now described with reference also to FIGS. 4 and FIG. 5. Digitized radar radial video data corresponding to the standard angle ($\theta_1$) shown in FIG. 4 is stored in a high speed radial buffer memory (not shown, but known to one of ordinary skill in the art). Each address of the buffer memory represents an increment of range along the radar radial path. A mass memory or bit image display refresh memory (not shown, but known to one of ordinary skill in the art) is used to store the converted video data in cartesian coordinates (X,Y). The number of memory locations corresponds to the number of pixel locations on the CRT to be used as a raster display. An X Address 78 and Y Address 82 are generated by the scan converter identifying a mass memory location for the storage of the input radar radial data associated with that address. In addition, a Radial Address 84 is generated which identifies the specific radar return data stored in the input radar radial buffer memory to be transferred to that corresponding X,Y mass memory location. Three tables of values are stored in PROMS 14, 42 and 44 for use during the coordinate conversion procedure. Each address of the PROMS 14, 42 and 44 contains the values required for the calculation performed within each standard angle increment ($\Delta\theta$) during the conversion procedure. As noted previously, a standard angle increment is generally 0.5° or less and typically there are 200 to 250 standard angles per quadrant (depending on the angle selected).

Referring now to FIGS. 1A, 1B and 4, assume that the processing for point 3 within the standard angle increment ($\Delta\theta$) has just been completed in which case the following operation occurs:

1. The X Increment Counter 26 is advanced one count by Clock 24.
2. The new output of X Adder 28 is compared with the X End Accumulator 22 in Comparator 30.
3. The X position output line 77 from the X Adder 28 now exceeds the X address corresponding to the Stop Boundary 1 in FIG. 4 causing a Y Line Advance 80 signal to occur.
4. The Y Line Advance 80 causes the value provided by Register 16 (previous $\Delta X/\Delta Y$) and Register 18 (current $\Delta X/\Delta Y$) to be added to the X Start Accumulator 20 and the X End Accumulator 22 respectively, and it resets the X Increment Counter 26. It also increments the Y Increment Counter 34 defining a new Y Address 82.
5. The Y Line Advance 80 also causes the $\Delta R/\Delta Y$ PROM 42 output to be added to the Radial Accumulator 46. In addition, the Y Line Advance 80 signal causes the Multiplexers 50 and 52 (for the subsequent clock pulse only) to switch such that Multiplexer 50 provides the 4-Bit Multiplier 48 output to the Range Accumulator 54 and Multiplexer 52 provides the Radial Accumulator 46 output to the Range Accumulator 54.
6. The clock pulse subsequent to the Y Line Advance 80 signal event causes the Range Accumulator 54 to assume the value equal to the sum of the 4-Bit Multiplier 48 output and the Radial Accumulator 46 output. This sum is equal to the Radial Address corresponding to the pixel location designated as point 4 in FIG. 4. Illustrated in FIG. 4 is the $\Delta R_Y$ magnitude added to the Radial Accumulator 46 to define the range of the point of intersection of the Start Boundary 1 with the Y-axis position $Y_2$. FIG. 5 illustrates the fractional portion ($\Delta X_b$) of a complete $\Delta X$ increment which must be employed to compute a corresponding $\Delta R$ distance to point 4 of FIGS. 4 and 5. The $\Delta X_b$ distance is approximated as the ones complement of the four most significant fractional bits of the Start Boundary 1 address at Y-axis position $Y_2$ and it is provided to the 4-Bit Multiplier 48 which also receives as its other input a $\Delta R$ increment per whole $\Delta X$ increment from PROM 44. The output of the 4-Bit Multiplier 48 ($\Delta R$) corresponds to the fractional portion of the $\Delta R/\Delta X$ value necessary to adjust the value provided by the Radial Accumulator 46 to the new range distance (or Radial Address 84) for point 4 of FIG. 4.
7. At the same clock pulse for which the Range Accumulator 54 assumes the range or Radial Address 84 of point 4 in FIG. 4, the X Increment Counter 26 is advanced to 1 to define at the output of X Adder 28 the X Address 78 for point 4.
8. Since the address of point 4 is found to be less than the Stop Boundary 1 X address intersection (an integer compare only), the video data stored in the address corresponding to the Radial Address 84 provided by Range Accumulator 54 is selected as the data to be stored in the mass memory address corresponding to the pixel address for point 4 in FIG. 4 defined by X Address 78 and Y Address 82.
9. Point 5 or pixel 5 of FIG. 4 is now processed by advancing the X Increment Counter 26 by 1 and simultaneously adding to the Range Accumulator 54 the $\Delta R/\Delta X$ increment value provided by PROM 44. This addition occurs via Multiplexers 50 and 52 when the output of PROM 44 is transferred through Multiplexer 50 and the previous Range Accumulator value is transferred through Multiplexer 52.
10. Assuming point 5 is found to be less than the Stop Boundary 1 address intersection, the video data stored in the radial address corresponding to the new Range Accumulator 54 output is selected as the data to be stored in the mass memory address corresponding to the pixel address for point 5 in FIG. 4 defined by a new X Address 78 and the Y address for $Y_2$.
11. The processing of X points along $Y_2$ continues until incrementing the X Increment Counter 26 causes the X Adder 28 to produce an X address which exceeds the integer portion of the X End Accumulator 22 which then causes a new Y Line Advance 80 signal to occur.

This concludes the description of the preferred embodiment. However, many modifications and alterations will be obvious to one of ordinary skill in the art without departing from the spirit and scope of the inventive concept; for example, the PROMs 14, 42 and 44 may be ROMs. Therefore, it is intended that the scope of this invention be limited only by the appended claims.

What is claimed is:

1. In combination:
    means for generating a plurality of X addresses to specify picture elements on a raster display during a conversion of data defined by R, $\theta$ polar coordinates to data defined by X, Y cartesian coordinates;
    means for generating a plurality of Y addresses to specify said picture elements on a raster display during said conversion;
    means for generating radial addresses corresponding to an ordered sequence of picture element addresses within a standard angle increment on a raster display said generating means comprising accumulating means for determining the boundaries of said standard angle increment and for determining said radial addresses based on coordinate system conversion values, said radial addresses specifying the location of stored input data to be transferred to mass memory locations specified by said X addresses and said Y addresses;
    means for generating successive X, Y addresses and corresponding radial addresses for all picture elements within a standard angle increment; and
    means for generating said successive X, Y addresses and corresponding radial addresses for successive standard angle increments corresponding to successive input radial paths.

2. The combination as recited in claim 1 wherein:
    said X addresses and said Y addresses for picture elements on a raster display correspond to said X addresses and Y addresses of mass memory locations used for the storage of said input data prior to transmittal to said raster display.

3. The combination as recited in claim 1 wherein:

said radial address generated for each picture element on said raster display represents the range of a picture element from an origin in said cartesian coordinate system.

4. The combination as recited in claim 1 wherein:
said stored input data of a radial path represents the digitized data obtained for increments of range along an azimuth angle.

5. In combination:
means for generating a plurality of X addresses to specify picture elements on a raster display during a conversion of data defined by R, $\theta$ polar coordinates to data defined by X, Y cartesian coordinates;

means for generating a plurality of Y addresses to specify said picture elements on a raster display during said conversion;

means for generating radial addresses, corresponding to an ordered sequence of picture element addresses within a standard angle increment on a raster display said generating means comprising accumulating means for determining the boundaries of said standard angle increment and for determining said radial addresses using stored coordinate system conversion values, said radial addresses specifying the location of stored input data to be transferred to mass memory locations specified by said X addresses and said Y addresses;

means for generating successive X, Y addresses and corresponding radial addresses for all picture elements on a raster display within a standard angle increment, said increment being the difference between two adjacent standard angles;

means for generating said successive X, Y addresses and corresponding radial addresses for successive standard angle increments corresponding to successive input radial paths; and means for storing said coordinate system conversion values for each said standard angle used for the generation of said X addresses, Y addresses and radial addresses.

6. The combination as recited in claim 5 wherein:
said X addresses and said Y addresses for picture elements on a raster display correspond to said X addresses and Y addresses of mass memory locations used for the storage of said input data prior to transmittal to said raster display.

7. The combination as recited in claim 5 wherein:
said radial address generated for each picture element on said raster display represents the range of a picture element from an origin in said cartesian coordinate system.

8. The combination as recited in claim 5 wherein:
said stored input data of a radial path represents the digitized data obtained for increments of range along an azimuth angle.

9. The combination as recited in claim 5 wherein:
said conversion values in said storing means includes values for each said standard angle within an octant, a quadrant or full 360 degrees.

10. In combination:
means for generating a plurality of X addresses to specify picture elements on a raster display during a conversion of data defined by R, $\theta$ polar coordinates to data defined by X, Y cartesian coordinates;

means for generating a plurality of Y addresses to specify said picture elements on a raster display during said conversion;

means for generating radial addresses corresponding to an ordered sequence of picture element addresses within a standard angle increment on a raster display, said generating means comprising accumulating means for determining the boundaries of said standard angle increment and for determining said radial addresses using stored coordinate system conversion values, said radial addresses specifying the location of stored input data to be transferred to mass memory locations specified by said X addresses and said Y addresses;

means for generating successive X, Y addresses and corresponding radial addresses for all picture elements on a raster display within a standard angle increment, said increment being the difference between two adjacent standard angles;

means for generating said successive X, Y addresses and corresponding radial addresses for successive standard angle increments corresponding to successive input radial paths;

means for storing said coordinate system conversion values for each said standard angle used for the generation of said X addresses, Y addresses and radial addresses; and means for controlling an access to said conversion values storing means as a function of a quadrant in which a coordinate conversion is being performed thereby minimizing the size of said storing means.

11. The combination as recited in claim 10 wherein:
said X addresses and said Y addresses for picture elements on a raster display correspond to said X addresses and Y addresses of mass memory locations used for the storage of said input data prior to transmittal to said raster display.

12. The combination as recited in claim 10 wherein:
said radial address generated for each picture element on said raster display represents the range of a picture element from an origin in said cartesian coordinate system.

13. The combination as recited in claim 10 wherein:
said stored input data of a radial path represents the digitized data obtained for increments of range along an azimuth angle.

14. The combination as recited in claim 10 wherein:
said conversion values in said storing means includes values for each said standard angle within an octant, a quadrant or full 360 degrees.

15. The combination as recited in claim 10 wherein:
said storing means comprises a first memory means for storing said standard angle values representing a change in said X address for an increment of said Y address.

16. The combination as recited in claim 15 wherein:
said storing means further comprises a second memory means for storing said standard angle values representing a change in said radial address for an increment in said Y address.

17. The combination as recited in claim 16 wherein:
said storing means further comprises a third memory means for storing said standard angle values representing a change in said radial address for an increment in said X address.

18. The combination as recited in claim 10 wherein:
said radial address generating means further comprises means for determining changes in said radial address for a non-integer increment.

19. In combination:

means for specifying a standard angle for use during a conversion of defining data with polar coordinates to cartesian coordinates, said means being responsive to an input signal for advancing to a plurality of successive standard angles;

first memory means responsive to said standard angle specifying means for storing conversion values for each said standard angle providing a change in an X address for each increment of a Y address;

first accumulating means responsive to said first memory means for generating X addresses and for determining start and end boundaries of a plurality of said X addresses within a standard angle increment;

means for generating a plurality of successive Y addresses within a standard angle increment during said conversion;

second memory means responsive to said standard angle specifying means for storing conversion values for each said standard angle, said conversion values providing a change in a range radial described by a radial address for each increment of a Y address, said radial extending from an origin to each said X address and Y address location of the corresponding standard angle boundary;

third memory means responsive to said standard angle specifying means for storing conversion values for each said standard angle providing a change in said range radial or radial address for each increment of an X address;

second accumulating means for summing the output of said second memory means for each increment of said Y address during a standard angle increment conversion; and third accumulating means for summing the incremental changes in said radial address resulting from incremental changes in said X address and said Y address, said radial address specifying the location of stored input data to be transferred to a mass memory location specified by said X address and said Y address.

20. The combination as recited in claim 19 wherein:
said standard angle increment is the difference between two adjacent standard angles.

21. The combination as recited in claim 19 wherein:
said standard angle specifying means comprises one or more counters.

22. The combination as recited in claim 21 wherein:
said standard angle specifying means further comprises quadrant control means for incrementing or decrementing said counters.

23. The combination as recited in claim 19 wherein:
said X address generating means comprises an X counter means for determining the number of X increments processed at a current Y address within a standard angle increment.

24. The combination as recited in claim 23 wherein:
said first accumulating means further comprises an X START accumulator and an X END accumulator.

25. The combination as recited in claim 24 wherein:
said X address generating means further comprises an adder means for combining the output of said X counter means with an output from said X START accumulator.

26. The combination as recited in claim 19 wherein:
said X address generating means comprises a comparator means for comparing the current X address within a standard angle increment to a predetermined X END address for a current Y address line being processed.

27. The combination as recited in claim 26 wherein:
said comparator means generates a Y line advance signal when said current X address equals or is greater than said X END address.

28. The combination as recited in claim 19 wherein:
said third accumulating means comprises means for approximating said range radials or radial addresses when said X address corresponding to the start of said standard angle is not an integer.

29. The combination as recited in claim 19 wherein:
said first, second and third memory means comprises a plurality of PROMs.

30. In combination:
means for specifying a standard angle for use during a conversion of defining data with polar coordinates to cartesian coordinates, said means being responsive to an input signal for advancing to a plurality of successive standard angles;

first memory means responsive to said standard angle specifying means for storing conversion values for each said standard angle providing a change in an X address for each increment of a Y address;

first accumulating means responsive to said first memory means for generating X addresses and for determining start and end boundaries of a plurality of X addresses within a standard angle increment;

means for generating a plurality of successive Y addresses within a standard angle increment during said conversion;

second memory means responsive to said standard angle specifying means for storing conversion values for each said standard angle, said conversion values providing a change in a range radial described by a radial address for each increment of a Y address, said radial extending from an origin to each said X address and Y address location of a corresponding standard angle boundary;

third memory means responsive to said standard angle specifying means for storing conversion values for each said standard angle providing a change in said range radial or radial address for each increment of an X address;

second accumulating means for summing the output of said second memory means for each increment of said Y address during a standard angle increment conversion;

third accumulating means for summing the incremental changes in said radial address resulting from incremental changes in said X address and said Y address, said radial address specifying the location of stored input data to be transferred to a mass memory location specified by said X address and said Y address;

multiplier means responsive to said first accumulating means and said third memory means for calculating changes of said radial address resulting from a non-integer increment in said X address; and decoder means responsive to said third accumulating means for determining when a maximum radial address or a maximum X address is reached.

31. The combination as recited in claim 29 wherein:
said standard angle increment is the difference between two adjacent standard angles.

32. The combination as recited in claim 29 wherein:
said standard angle specifying means comprises one or more counters.

33. The combination as recited in claim 32 wherein:
said standard angle specifying means further comprises quadrant control means for incrementing or decrementing said counters.

34. The combination as recited in claim 29 wherein:
said X address determining means comprises an X counter means for determining the number of X increments processed at a current Y address within a standard angle increment.

35. The combination as recited in claim 34 wherein:
said first accumulating means further comprises an X START accumulator and an X END accumulator.

36. The combination as recited in claim 35 wherein:
said X address generating means further comprises an adder means for combining the output of said X counter means with an output from said X START accumulator.

37. The combination as recited in claim 29 wherein:
said X address generating means comprises a comparator means for comparing the current X address within a standard angle increment to a predetermined X END address for a current Y address line being processed.

38. The combination as recited in claim 37 wherein:
said comparator means generates a Y line advance signal when said current X address equals or is greater than said X END address.

39. The combination as recited in claim 30 wherein:
said first, second and third memory means comprises a plurality of PROMs.

40. The method of converting data defined by R, θ polar coordinate format to X, Y cartesian coordinate format for display on a raster scan display comprising the steps of:
generating a plurality of X addresses to specify picture elements on said raster display;
generating a plurality of Y addresses to specify said picture elements on said raster display;
generating radial addresses corresponding to an ordered sequence of picture element addresses within a standard angle increment on a raster display said radial addresses specifying the location of stored input data to be transferred to mass memory locations specified by said X addresses and said Y addresses;
using accumulating means for determining the boundaries of said standard angle increment and for determining said radial addresses based on coordinate system conversion values;
generating successive X, Y addresses and corresponding radial addresses for all picture elements on a raster display within a standard angle increment, said increment being the difference between two successive standard angles;
generating said successive X, Y addresses and corresponding radial addresses for successive standard angle increments corresponding to successive input radial paths; and
storing said coordinate system conversion values for each said standard angle used for the generation of said X addresses, Y addresses and radial addresses.

41. The method as recited in claim 40 wherein:
said X addresses and said Y addresses for picture elements on a raster display correspond to said X addresses and Y addresses of mass memory locations used for the storage of said input data prior to transmittal to said raster display.

42. The method as recited in claim 40 wherein:
said radial address generated for each picture element on said raster display represents the range of a picture element from an origin in said cartesian coordinate system.

43. The method as recited in claim 40 wherein:
said stored input data of a radial path represents the digitized data obtained for increments of range along an azimuth angle.

44. The method as recited in claim 40 wherein:
said step of storing conversion values includes values for each said standard angle within an octant, a quadrant or full 360 degrees.

45. The method of converting data defined by R, θ polar coordinate format to X,Y cartesian coordinate format for display on a raster scan display comprising the steps of:
specifying a standard angle for use during said conversion which advances by input signal means to a plurality of successive standard angles;
storing conversion values for each said standard angle which provide a change in an X address for each increment of a Y address;
generating X addresses by determining start and end boundaries of a plurality of said X addresses within a standard angle increment;
generating successive Y addresses within a standard angle increment during said conversion;
storing conversion values for each said standard angle, said conversion values provide a change in a range radial described by a radial address for each increment of a Y address, said radial extending from an origin to said X address and said Y address location of a corresponding standard angle boundary;
storing conversion values for each said standard angle which provide a change in said range radial or radial address for each increment of an X address;
summing the changes in said radial address for each increment of said Y address during a standard angle increment conversion; and
summing the incremental changes in said radial address caused by incremental changes in said X address and said Y address which produces a radial address in polar coordinates corresponding to a selected picture element within a standard angle increment on said raster display having an X address and a Y address in cartesian coordinates, said radial address specifying the location of stored input data to be transferred to a mass memory location specified by said X address and said Y address.

46. The method as recited in claim 45 wherein:
said standard angle increment is the difference between two adjacent standard angles.

47. The method as recited in claim 45 wherein:
the step of specifying a standard angle comprises one or more counters.

48. The method as recited in claim 47 wherein:
the step of specifying a standard angle further comprises quadrant control for incrementing or decrementing said counters.

49. The method as recited in claim 45 wherein:
the step of generating X addresses comprises an X counter for determining the number increments processed at a current Y address within a standard angle increment.

50. The method as recited in claim 49 wherein:

said step of generating said X addresses by determining start and end boundaries comprises an X START accumulator and an X END accumulator.

51. The method as recited in claim 50 wherein:
the step of generating X addresses further comprises an adder means for combining the output of said X counter means with an output from said X START accumulator.

52. The method as recited in claim 45 wherein:
the step of generating X addresses comprises comparing the current X address within a standard angle increment to a predetermined X END address for a current Y address line being processed.

53. The method as recited in claim 52 wherein:
said step of comparing the current X address within a standard angle increment to a predetermined X END address for a current Y address line being processed generates a Y line advance signal when said current X address equals or is greater than said X END address.

54. The method as recited in claim 45 wherein:
the step of summing the incremental changes of said radial address for changes in said X address and said Y address further comprises calculations for said radial address when said X address corresponding to the start of said standard angle is not an integer.

* * * * *